United States Patent [19]

Persson

[11] Patent Number: 4,496,096
[45] Date of Patent: Jan. 29, 1985

[54] METHOD OF JOINING METAL ELEMENTS BY EXPLOSION WELDING

[75] Inventor: Per I. Persson, Nora, Sweden
[73] Assignee: Nitro Nobel A.B., Gyttorp, Sweden
[21] Appl. No.: 427,366
[22] Filed: Sep. 29, 1982
[30] Foreign Application Priority Data Oct. 26, 1981 [SE] Sweden ................. 8106319

[51] Int. Cl.³ ............................. B23K 27/00
[52] U.S. Cl. .................................. 228/107
[58] Field of Search ............. 228/107, 108, 109; 283/173

[56] References Cited

U.S. PATENT DOCUMENTS

| 3,335,488 | 8/1967 | Cole ............................. | 228/107 |
| 3,672,035 | 6/1972 | Lieberman .................... | 228/107 |
| 3,863,327 | 2/1975 | Legate et al. ................. | 228/107 |
| 3,900,148 | 8/1975 | Chadwick et al. ............ | 228/107 |
| 4,003,513 | 1/1977 | Int. Res. & Dev. Co. Ltd. ... | 228/107 |
| 4,010,965 | 3/1977 | Izuma et al. .................. | 285/173 |
| 4,248,373 | 2/1981 | Linse et al. ................... | 228/107 |

FOREIGN PATENT DOCUMENTS

| 2728409 | 4/1978 | Fed. Rep. of Germany ...... | 228/108 |
| 55-5114 | 1/1980 | Japan ........................... | 228/107 |

Primary Examiner—Nicholas P. Godici
Assistant Examiner—M. Jordan
Attorney, Agent, or Firm—Dennison, Meserole, Pollack & Scheiner

[57] ABSTRACT

The invention shows a method of joining metal elements by means of explosion welding, the edges of the metal element being bent up or otherwise provided with flanges. Since the charge(s) act primarily on the flanges in a direction other than the longitudinal direction of the metal elements, deformation of the metal elements is avoided or reduced. Due to its simplicity the joint is easily reproducible and is particularly suited for work under water.

12 Claims, 16 Drawing Figures

METHOD OF JOINING METAL ELEMENTS BY EXPLOSION WELDING

The joining of metals to produce compound material by means of explosion welding and joining metal elements by overlapping, phasing, etc. are known through several patents and other publications. Excellent results have been achieved by all these methods, provided that the material can be efficiently underpinned so as to avoid too much deformation. If this has been impossible, then it has been impossible to use the explosion-welding process.

With the process according to the invention, this limitation has been eliminated by shaping the metal elements at the splicing point to provide a reinforced section perpendicular to the longitudinal direction of the metal elements and by considerably reducing the force of the explosive gases perpendicular to the longitudinal direction of the metal elements. The need for supports in the form of clamps or the like has thus been drastically reduced or completely eliminated.

DESCRIPTION

Figure 1A:
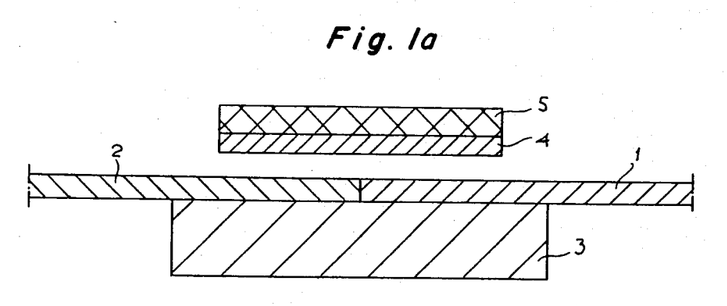
FIGS. 1a and 1b are sequential cross-sectional views of the welding of a joint according to the prior art.
Figure 1B:
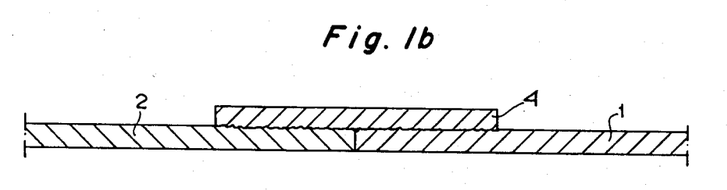

FIG. 1 shows an example of an explosion-welded joint in accordance with a known method. The metal elements 1 and 2 are placed on the support 3, and the metal piece 4 is welded over the joint using an explosive charge 5, in known manner. FIG. 1A shows the arrangement before firing, and FIG. 1B the finished joint.

Figure 2A:
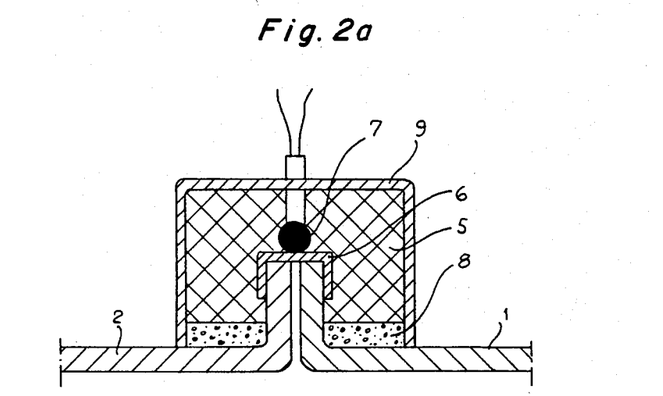
FIGS. 2a and 2b are sequential cross-sectional views of the welding of a joint according to the present invention.

FIG. 2 shows a joint in accordance with the present invention. The edges of the metal elements 1 and 2 have been bent to form a flange, which is surrounded by the explosive charge 5. A section 6 is applied over the top of the flanges to prevent the explosion gases from penetrating into the gap between the flanges. The explosive charge is initiated in known manner with the aid of the initiator 7, such as a detonating fuse with higher detonation speed than the charge 5.

Figure 2B:
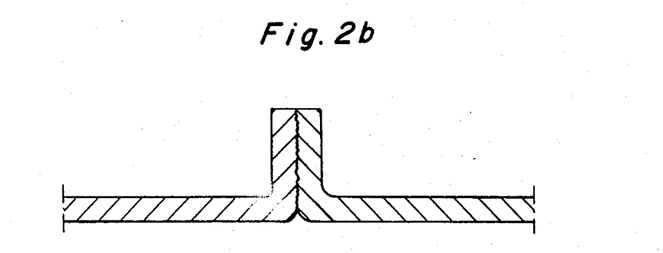
Figure 2C:
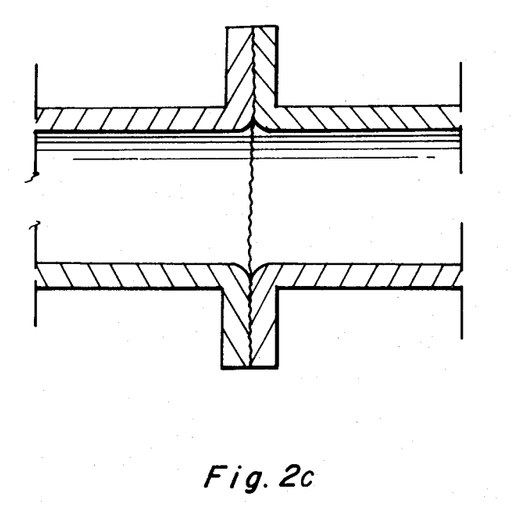
FIG. 2c is a cross-sectional view of the joint resulting from the welding of pipe sections.
Figure 3A:
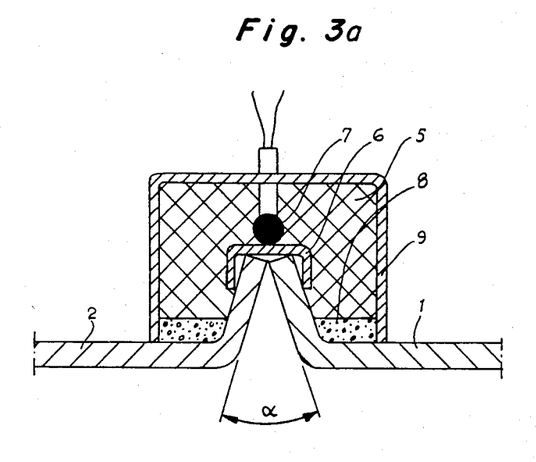
FIGS. 3a and 3b are sequential cross-sectional views of a variation of the welding of a joint according to the present invention, in which the flanges are not parallel.
Figure 3B:
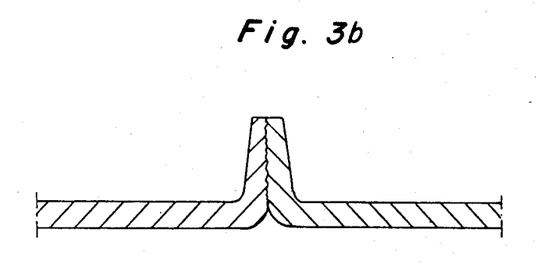

The charge is enclosed by the container 9 of inert material. A protector 8 has been located between the charge 5 and the longitudinal sections of the elements 1 and 2, said protector comprising a light, porous material such as fibreboard, foam plastic, corrugated cardboard, etc. When the charge detonates a high pressure is exerted on the flanges so that they are forced together and collide, producing an explosion weld over an area from the top of the flanges down, as indicated by the wavy line in FIG. 2B, showing the joint formed. FIG. 2c shows in cross-section, the joint formed from the welding of two pieces of pipe. FIG. 3 shows a similar arrangement to that of FIG. 2. The flanges here form an angle to each other, as opposed to the arrangement in FIG. 2 where they are parallel. From the explosion-welding point of view this produces no difference in the result, but means that explosives with a higher detonation speed can be used.

Figure 4A:
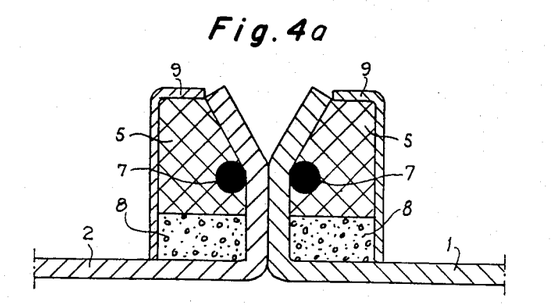
FIGS. 4a and 4b are cross-sectional views of a variation of the welding of a joint according to the present invention, in which detonation is initiated from below.
Figure 4B:
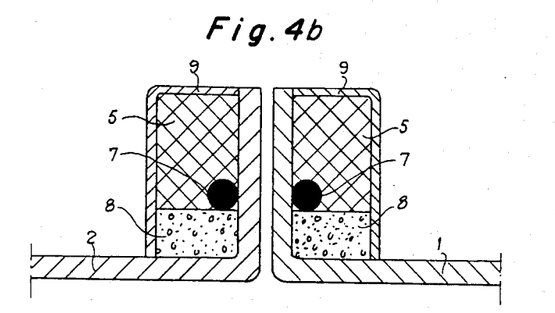
Figure 4C:
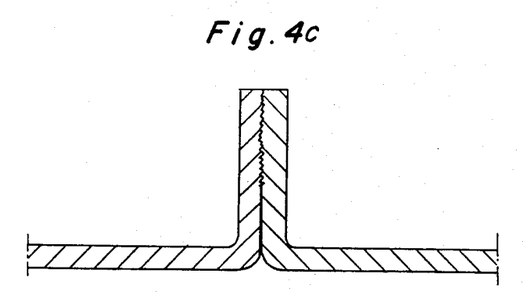
FIG. 4c is the resulting joint.

In the arrangements shown in FIGS. 2 and 3 initiation occurs at the top and the acceleration therefore moves downwardly. FIG. 4 illustrates cases with angle (4A) and parallel (4B) arrangement, but with initiation from below. The arrangements according to FIG. 4 affect the shape of the metal elements even less in their primary direction, but require greater flange height and a more complicated initiation system, especially if the metal elements to be joined are tubular.

Figure 5:
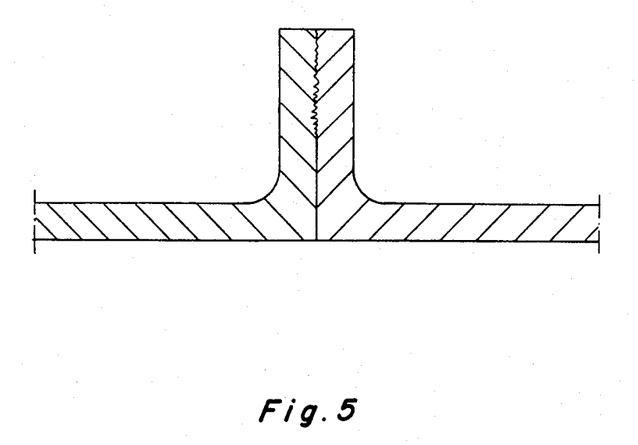
FIG. 5 is a cross-sectional view of a weld according to the present invention, in which the metal elements become thinner close to the fillet.

With the method according to FIG. 2, and particularly with that according to FIG. 3, the metal elements often become thinner close to the fillet between flange and primary direction of the element, as shown schematically in FIG. 5. Since the process is performed in a few microseconds the elements do not have time to move, due to mass inertia, and are therefore stretched. In the arrangement according to FIG. 4A, this drawback has been completely overcome since the lower part of the flanges are already in contact with each other before joining. This is also the case in FIGS. 2 and 4B and to a certain extent also in FIG. 3, the thinning can be reduced to about 1% of the material thickness by making the gap between the flanges small. This can generally be compensated within reasonable limits by increasing the explosive charge.

Figure 6A:
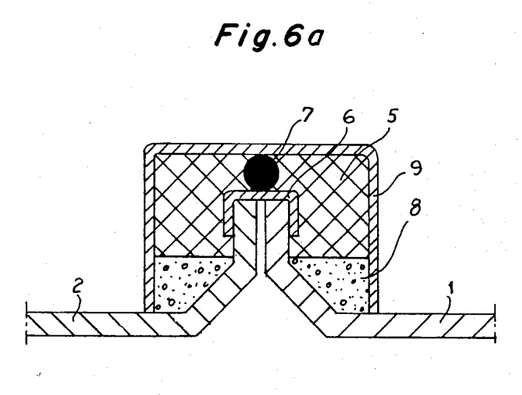
FIGS. 6a and 6b are cross-sectional views of variations of a weld according to the present invention, in which thinning of the metal is avoided.
Figure 6B:
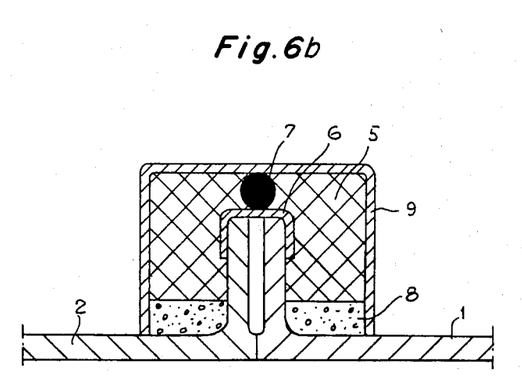

In arrangements according to FIGS. 2, 3 and 4A, thinning of the material can also be eliminated in other ways. An example is shown schematically in FIG. 6. According to FIG. 6A, the lower part of the flange is shaped so that upsetting caused by the downward movement compensates pulling in the longitudinal direction of the elements. According to FIG. 6B the flanges are provided with a shoulder at the bottom which prevents longitudinal pulling of the metal elements.

During the experiments on which the claimed method is based, it has proved advantageous to grind the surfaces of the flanges to be joined. Provided this is done, most metallic materials such as steel, copper, aluminium, titanium, copper-nickel, etc., can be joined according to the method. This applies if both elements are of the same material and even if they are of different materials. The jointing method has been developed with the specific intention of joining pipelines under water where it is economically particularly favourable. However, the method is obviously also favourable for other applications, both in the case of straight and circular joints either above or below water. It is to be understood that any of the various methods of the invention discussed above can be applied to the welding of flat metal sheets, curved metal sheets, or pipes.

Figure 7:
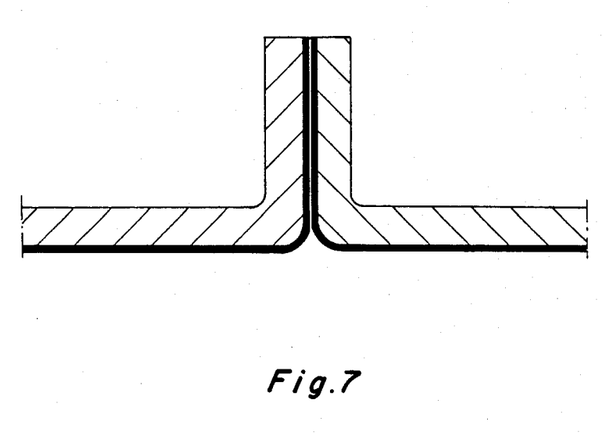
FIG. 7 is a cross-sectional view of a weld according to the present invention, in which the joined pieces are coated.

When splicing under water the gap should preferably be sealed in known manner and the water removed. Problems arise when joining compound materials by means of fusion welding and known explosion-welding processes since the material in the corrosion-protected plating 10 and 11 FIG. 7 may not be mixed with the base material, neither may the base material be exposed to corrosive media. These problems are entirely eliminated by the present method, see FIG. 7. The method also permits the use of a considerably thinner plating layer since the base material and plating are not mixed during welding.

Figure 8A:
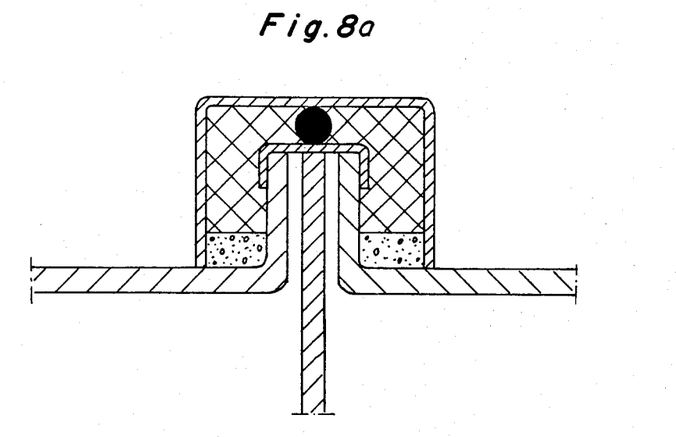
FIGS. 8a and 8b are sequential cross-sectional views of a weld according to the present invention, in which three pieces are joined.
Figure 8B:
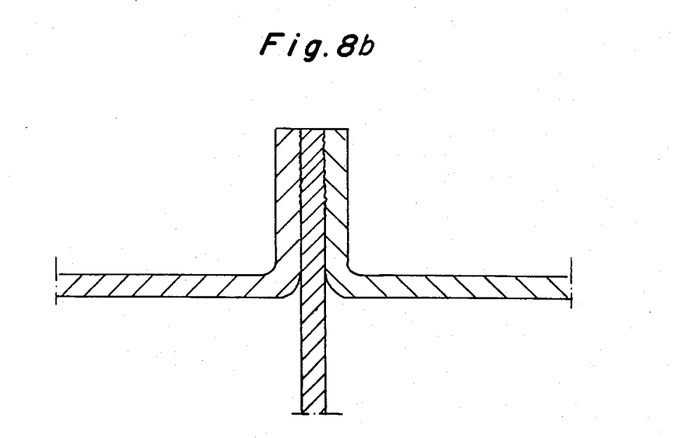

The method also enables simultaneous joining of more than two metal elements, see FIG. 8.

I claim:

1. Method of joining two or more metal pieces wherein two of said metal pieces are normally substantially coplanar with a reference plane, comprising the steps of: (1) providing each of said coplanar pieces with a flange at an angle to said plane (2) bringing each of said flanges into proximity, and (3) detonating at least one explosive charge to weld said flanges together.

2. Method according to claim 1, wherein at least a portion of said flanges is not directly in contact prior to said detonation defining a gap between said flanges, and wherein at least one cap is provided at the free ends of said flanges to prevent explosive gases from entering into said gap.

3. Method according to claim 1, wherein at least a portion of said flanges is not directly in contact defining a gap between said flanges, and wherein containment means is provided for each flange, said means having walls which extend from each flange to the piece of which it is a part, an explosive charge being detonated within each said containment means.

4. Method according to claim 1, wherein the flange of each said piece has two regions, a first region which is at an angle of substantially 90° to said plane, and a second region which is at an angle of less than 90° to said plane, said first region being connected to said piece by said second region.

5. Method according to claim 1, wherein the flange of each said piece is provided with a shoulder at a point adjacent to and opposite from the point at which the flange joins the piece of which it is a part, and wherein said shoulders are brought into contact prior to the detonation of said at least one explosive charge.

6. Method according to claim 1, additionally comprising bringing a metal piece which is substantially perpendicular to said plane, between said flanges to be welded to each of said flanges.

7. Method according to claim 1, wherein each said piece is in the form of a substantially flat sheet.

8. Method according to claim 1, wherein said joining is performed under water.

9. Method according to claim 1, wherein said joining is performed above water.

10. Method according to claim 1, wherein said two of said metal pieces comprise different materials.

11. Method according to claim 1, wherein said two of said metal pieces comprise metals which are coated.

12. Method of joining two coaxial metal pipes of substantially the same diameter, comprising the steps of: (1) providing each of said pipes with a flange at an angle to the common axis of the pipes, (2) bringing said flanges into proximity, and (3) detonating at least one explosive charge to weld said flanges together.

* * * * *